United States Patent
Bhadekar et al.

(10) Patent No.: US 9,742,725 B2
(45) Date of Patent: Aug. 22, 2017

(54) NETWORK ADDRESS IDENTIFICATION

(71) Applicant: International Business Machines Corporation, Armonk, NY (US)

(72) Inventors: Kalyani Bhadekar, Pune (IN); Sanjay V. Phanshikar, Pune (IN); Manish Singh, Wakad (IN)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 14/317,081

(22) Filed: Jun. 27, 2014

(65) Prior Publication Data

US 2015/0381564 A1    Dec. 31, 2015

(51) Int. Cl.
*G06F 15/173* (2006.01)
*H04L 29/12* (2006.01)
*H04L 12/24* (2006.01)
*H04W 4/00* (2009.01)

(52) U.S. Cl.
CPC ...... *H04L 61/2015* (2013.01); *H04L 41/0853* (2013.01); *H04L 61/2007* (2013.01)

(58) Field of Classification Search
CPC  H04L 41/0213; H04L 29/08072; H04L 29/06
USPC ....................................................... 709/223
See application file for complete search history.

(56) References Cited

FOREIGN PATENT DOCUMENTS

| CN | 201974801 U | 9/2011 |
|---|---|---|
| CN | 202384010 U | 8/2012 |
| EP | 2348420 A1 | 7/2011 |
| TW | 421576 U | 1/2012 |

OTHER PUBLICATIONS

Bogue, Robert L., "Get It Done: IP host name resolution troubleshooting guide", Mar. 18, 2003, <http://www.techrepublic.com/article/get-it-done-ip-host-name-resolution-troubleshooting-guide/>.
Riley, Adam, "An Unofficial Raspberry Pi Blog", Dec. 27, 2012, <http://www.raspberrypiblog.com>.
"pen drive with display", Google Search, printed May 16, 2014, <https://www.google.co.in/search?q=pen+drive+with+display&biw=1511&bih=672&tbm=isch&tbo=u&source=univ&sa=X&ei=x0IWUvGNbq78iQfj4oDoAw&ved=0CDUQsAQ>.
"Nokia Support", Kinoni, printed May 16, 2014, <http://www.kinoni.com/support_nokia.html>.
"Get My IP—Find Local and Internet IP Address", Copyright 2006-2014 USB Pen Drive Apps., <http://www.pendriveapps.com/get-my-ip-find-local-and-internet-ip-address/>.
"Turkish Registrar Enabled Phishers to Spoof on Google", Krebs on Security, May 16, 2014, p. 1-14, <http://krebsonsecurity.com/2013/01/turkish-registrar-enabled-phishers-to-spoof-google/>.

*Primary Examiner* — Alan S Chou
(74) *Attorney, Agent, or Firm* — Daniel R. Simek

(57) ABSTRACT

In a method for determining network information, in response to a computing device connecting to a computing system, the computing device identifying network information that corresponds to the computing system, wherein the computing system is configured to pass network information to the computing device while the computing system is powered on, but not logged in. The method further includes the computing device determining at least one network address for the computing system utilizing the identified network information that corresponds to the computing system. The method further includes the computing device displaying the determined at least one network address for the computing system.

20 Claims, 3 Drawing Sheets

NETWORK ADDRESS IDENTIFICATION

BACKGROUND OF THE INVENTION

The present invention relates generally to the field of network communications, and more particularly to determining a network address of a computing device.

A computer network is a telecommunications network that allows computers to communicate and exchange data. In a computer network, networked computing devices pass data to each other through data connections. The data connections (e.g., network links) can be established utilizing cable media, and/or wireless media. A common example of a computer network is the Internet.

The Internet Protocol (IP) is a set of rules for sending information between computers on the Internet. Each computer that utilizes Internet Protocol has at least one IP address, which identifies the computer to other computers over the Internet. An IP address is a numerical label that is assigned to a computing device (e.g., a desktop computer, a laptop computer, a printer, etc.) that is communicating via a computer network, using Internet Protocol. IP addresses provide an identification of a host or network interface, and location addressing. IP addresses are binary numbers, but can be typically stored in text files and displayed in human-readable notation (e.g., 111.22.333.4). The Dynamic Host Configuration Protocol (DHCP) is a networking protocol used on Internet Protocol networks for dynamically distributing network configuration parameters, such as IP addresses for interfaces and services.

SUMMARY

Aspects of the present invention disclose a method, computer program product, and system for determining network information. The method includes in response to a computing device connecting to a computing system, the computing device identifying network information that corresponds to the computing system, wherein the computing system is configured to pass network information to the computing device while the computing system is powered on, but not logged in. The method further includes the computing device determining at least one network address for the computing system utilizing the identified network information that corresponds to the computing system. The method further includes the computing device displaying the determined at least one network address for the computing system.

DETAILED DESCRIPTION

Embodiments of the present invention allow for determining and displaying a network address for a client device.

In one embodiment, a computing device establishes a connection to the client device and identifies network information corresponding to the client device. Utilizing the identified network information the computing device determines and displays one or more network addresses of the client device.

Some embodiments of the present invention recognize that computers belonging to an organization, and connected to the network of the organization often store confidential data. Only privileged users are able to access the sensitive data (e.g., via user ID and password authentication). A single user in the organization can own multiple computers, which can be located in different locations. To access a computer remotely, the user may need the corresponding Internet Protocol (IP) address of the computer. The IP address may be allocated to the computer using the Dynamic Host Configuration Protocol (DHCP).

Figure 1:
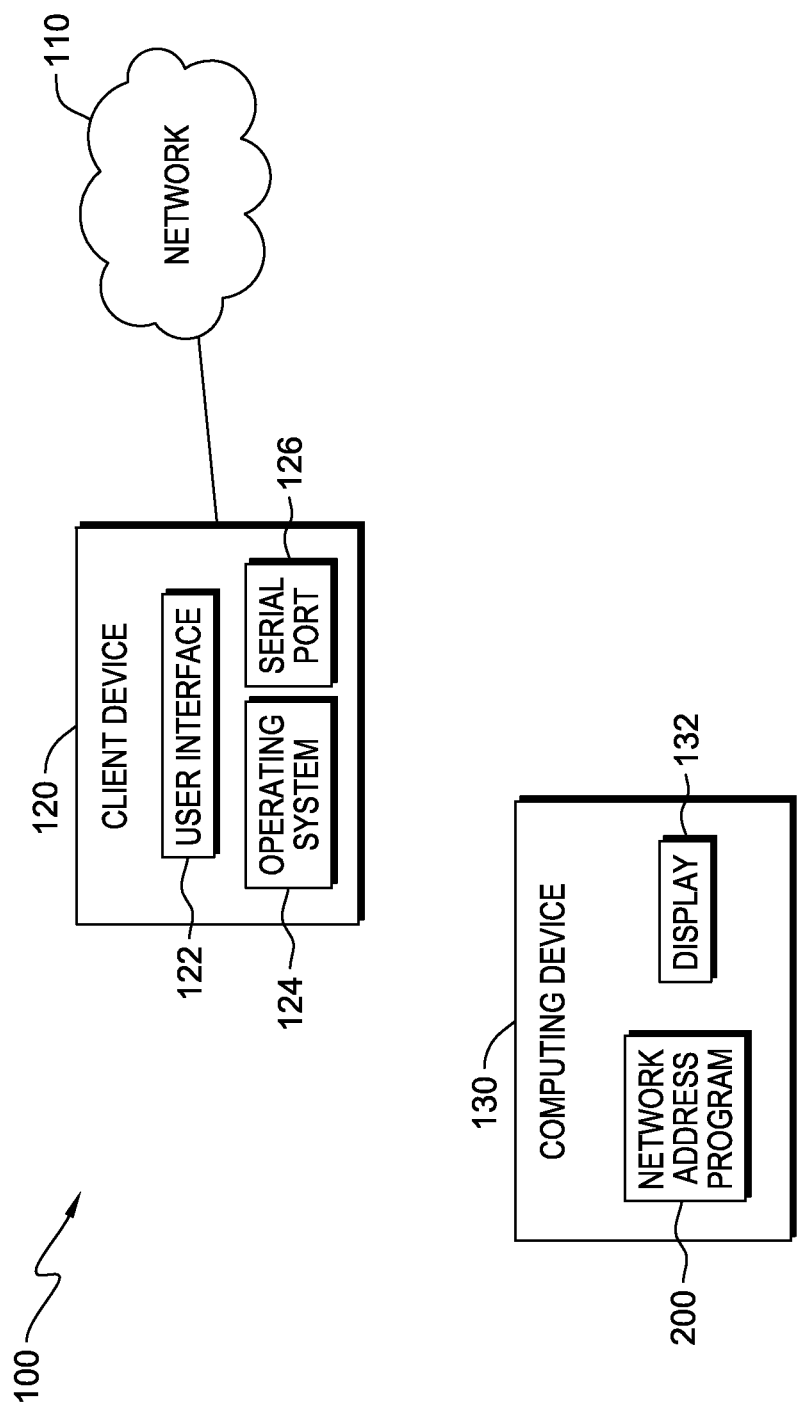
FIG. 1 is a functional block diagram of a data processing environment in accordance with an embodiment of the present invention.

The present invention will now be described in detail with reference to the Figures. FIG. 1 is a functional block diagram illustrating data processing environment 100, in accordance with one embodiment of the present invention.

An embodiment of the data processing environment includes network 110, client device 120, and computing device 130. In one embodiment, client device 120 and computing device 130 communicate through network 110. Network 110 can be, for example, a local area network (LAN), a telecommunications network, a wide area network (WAN) such as the Internet, or any combination of the three, and include wired, wireless, or fiber optic connections. In general, network 110 can be any combination of connections and protocols that will support communications between client device 120 and computing device 130 in accordance with embodiments of the present invention.

In one embodiment, client device 120 is secure computer operating in a network of an organization (e.g., network 120). In various embodiments of the present invention, client device 120 may be a workstation, personal computer, personal digital assistant, mobile phone, or any other device capable of executing computer readable program instructions in accordance with embodiments of the present invention. In general, client device 120 is representative of any electronic device or combination of electronic devices capable of executing computer readable program instructions. Client device 120 may include components as depicted and described in further detail with respect to FIG. 3, in accordance with embodiments of the present invention.

Client device 120 includes user interface 122, operating system 124 and serial port 126. User interface 122 is a program that provides an interface between a user of client device 120 and a plurality of applications that reside the server computer (not shown). A user interface, such as user interface 122, refers to the information (such as graphic, text, and sound) that a program presents to a user and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements.

Operating system 124 collection of software that manages computer hardware resources of client device 120 and provides common services for computer applications. Operating system 124 is a component of the system software of client device 120. Serial port 126 is a physical communication interface that client device 120 utilizes to transfer data. In example embodiments, serial port 126 can be a Universal Serial Bus (USB) port, an Ethernet port, or other ports that are capable of utilizing serial communication.

Computing device 130 includes display 132 and network address program 200. In one embodiment, computing device 130 is a USB storage drive that is capable of communicating with client device 120 via network 110 or serial port 126. In embodiments where computing device 130 is a USB storage device, computing device 130 may include components as depicted and described in further detail with respect to persistent storage 308 in FIG. 3 (e.g., a removable storage device), in accordance with embodiments of the present invention. In another embodiment, computing device 130 is a mobile computer or mobile phone capable of communicating with client device 120 via network 110 or serial port 126. In embodiments where computing device 130 is a mobile computer or mobile phone, computing device 130 may include components as depicted and described in further detail with respect to FIG. 3, in accordance with embodiments of the present invention. In various embodiments, computing device 130 can be any other device capable of communicating with client device 120 (e.g., via network 110 and serial bus 126), and executing computer readable program instructions in accordance with embodiments of the present invention. Display 132 provides a mechanism to display data to a user of computing device 130, and may be, for example, a liquid-crystal display (LCD) screen. Display 132 can also function as a touch screen, such as a display of a tablet computer. Network address program 200 determines and displays a network address of a computer (e.g., client device 120), in accordance with embodiments of the present invention.

In various embodiments, computing device 130 can connect to client device 120 (e.g., via serial port 126) and communicate with operating system 124. In one embodiment, client device 120 runs an authentication program (not shown) that allows computing device 130 to communicate with operating system 124 without client device 120 being logged in. In another embodiment, client device 120 is configured to pass network information to computing device 130 while client device 120 is powered on, but not logged in. For example, client device 120 assigns computing device 130 to have administrator privileges relative to operating system 124. In an example embodiment, network address program 200 operates on computing device 130, which has administrator privileges on operating system 124 of client device 120, and is capable of communicating with operating system 124 without write access to client device 120. In one embodiment, client device 120 is logged in when client device 120 receives and authenticates (e.g., via user input into user interface 122) a set of authentication credentials that correspond an approval to access client device 120 and information stored on client device 120. In another embodiment, client device 120 is powered on, but not logged in when client device 120 is powered on and operating (e.g., in a boot-up phase), but has not received and/or authenticated a set of authentication credentials. For example, if client device 120 is displaying a log in prompt to access operating system 124, then client device 120 is powered on, but not logged in. In another example, if client device 120 is booting up and has not yet displayed a login prompt, and the login prompt is required, then then client device 120 is powered on, but not logged in.

Figure 2:
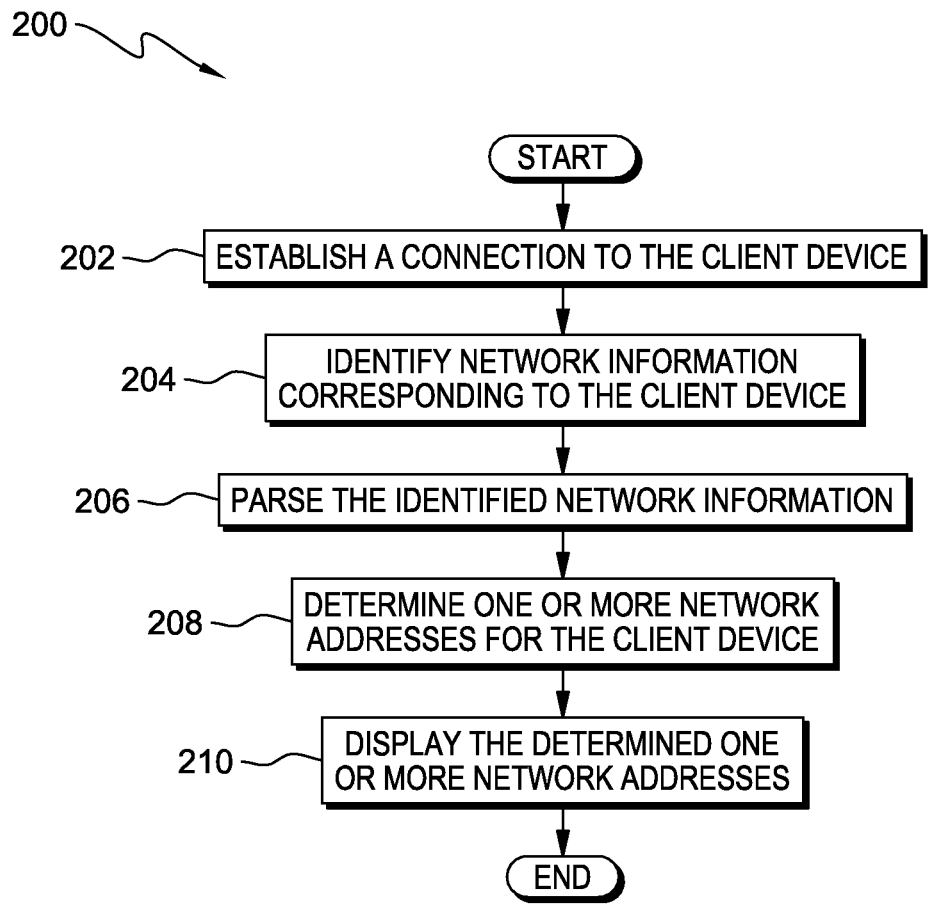
FIG. 2 is a flowchart depicting operational steps of a program for determining and displaying a network address of a client device, in accordance with an embodiment of the present invention.

FIG. 2 is a flowchart depicting operational steps of network address program 200, a program for determining and displaying a network address of a client device, in accordance with an embodiment of the present invention. In one embodiment, network address program 200 initiates in response to computing device 130 connecting to client device 120 (i.e., network address program 200 is an auto-run utility on computing device 130). In another embodiment, network address program 200 operates on computing device 130, which has administrator privileges on operating system 124 of client device 120.

In step 202, network address program 200 establishes a connection to the client device. In one embodiment, computing device 130 connects to client device 120, and network address program 200 establishes a connection to operating system 124 of client device 120. In another embodiment, client device 120 is powered on, but not logged in (e.g., not logged into a user profile of operating system 124). For example, computing device 130 establishes a connection to client device 120 while client device 120 is displaying a log in prompt to access operating system 124 (i.e., client device 120 is powered on, but not logged in). In another example, computing device 130 establishes a connection to client device 120 while client device 120 is booting up and has not yet displayed a login prompt, and the login prompt is required. In many embodiments, to be logged into client device 120, a user or a program enters authentication information (e.g., passwords or other forms of identification), into a field of a login prompt of client device 120. In response to receiving this authentication information, client device 120 confirms whether the authentication information is valid. If the verification information is valid, then client device 120 allows the user or program access to and use of operating system 124. In some embodiments, the access to and use of operating system 124 for a given user or program is governed by a profile, such as a user profile. Such a profile provides the limits of privileges that are applied to a user or program that has been granted access to and use of operating system 124. For example, some privileges allow the use of certain functions of operating system 124, while other privileges dictate a format and display of a graphical user interface used by operating system 124. In an example embodiment, computing device 130 is a USB storage device that connects to client device 120 via serial port 126. In another example embodiment, computing device 130 is a mobile phone that connects to client device 120 via serial port 126 or network 110 (e.g., wireless network communications).

In step 204, network address program 200 identifies network information corresponding to the client device. In one embodiment, network address program 200 accesses and utilizes Basic Input/Output System (BIOS) routines (e.g., system calls) of client device 120 to identify network information from a network adaptor (not shown) of client device 120. In another embodiment, network address program 200 communicates with operating system 124 identifies information corresponding to network communications of client device 120. For example, network address program 200 identifies network information that includes an IP address associated with client device 120, a media access control (MAC) address associated with client device 120, or other information associated with network communications of client device 120. In one embodiment, network address program 200 is capable of communicating with operating system 124 through native commands associated with operating system 124. In an example embodiment, network address program 200, via operating system 124, queries a router (not shown) associated with client device 120, and receives network information that corresponds to client device 120. In this embodiment, a router associated with client device 120 is capable of providing network information that includes an IP address that is assigned to client device 120 (e.g., via Dynamic Host Configuration Protocol (DHCP)).

In step 206, network address program 200 parses the identified network information. In one embodiment, network address program 200 parses the identified network information corresponding to client device 120 (identified in step 204) to identify data that is associated with network addresses (e.g., an IP address, a MAC address, etc.) of client device 120. In an example embodiment, network address program 200 utilizes metadata included in the identified network information, which can provide an indication of network addresses of client device 120. In another example embodiment, network address program 200 parses the identified network information by isolating one or more sections of the identified network information that corresponds to network addresses of client device 120.

In step 208, network address program 200 determines one or more network addresses for the client device. In one embodiment, network address program 200 utilizes the parsed identified network information corresponding to client device 120 (from step 206) to identify one or more network addresses that correspond to client device 120. In an example embodiment, network address program 200 determines one or more IP addresses associated with client device 120. In this embodiment, network address program 200 can identify the one or more IP addresses associated with a network adaptor of client device 120 (e.g., identified utilizing BIOS of client device 120), and one or more IP addresses that a router has assigned to client device 120 (e.g., via DHCP). In another example embodiment, network address program 200 determines one or more MAC addresses associated with client device 120. In other embodiments, network address program 200 can determine any type of network address, or a combination of types of network addresses that are associated with client device 120. In another embodiment, network address program 200 stores the determined network addresses on computing device 130.

In step 210, network address program 200 displays the determined one or more network addresses. In one embodiment, network address program 200 displays the determined one or more network addresses for client device 120 (from step 208) on display 132 of computing device 130. In another embodiment, if network address program 200 determines more than one network address for client device 120 (in step 208), then network address program 200 sequentially displays the determined network addresses. For example, network address program 200 displays "IP Address=111.22.333.4" followed by "MAC Address=01-23-45-67-89-ab." In other embodiments, network address program 200 can display the determined network addresses on a display other than display 132 on computing device 130 (e.g., a display not shown).

In another embodiment, network address program 200, via computing device 130, is capable of communicating with additional client devices (not shown) via network 110. In an example, in response to determining the IP address of client device 120, network address program 200 can provide the determined IP address to a user (on a client device not shown) via network 110.

Figure 3:
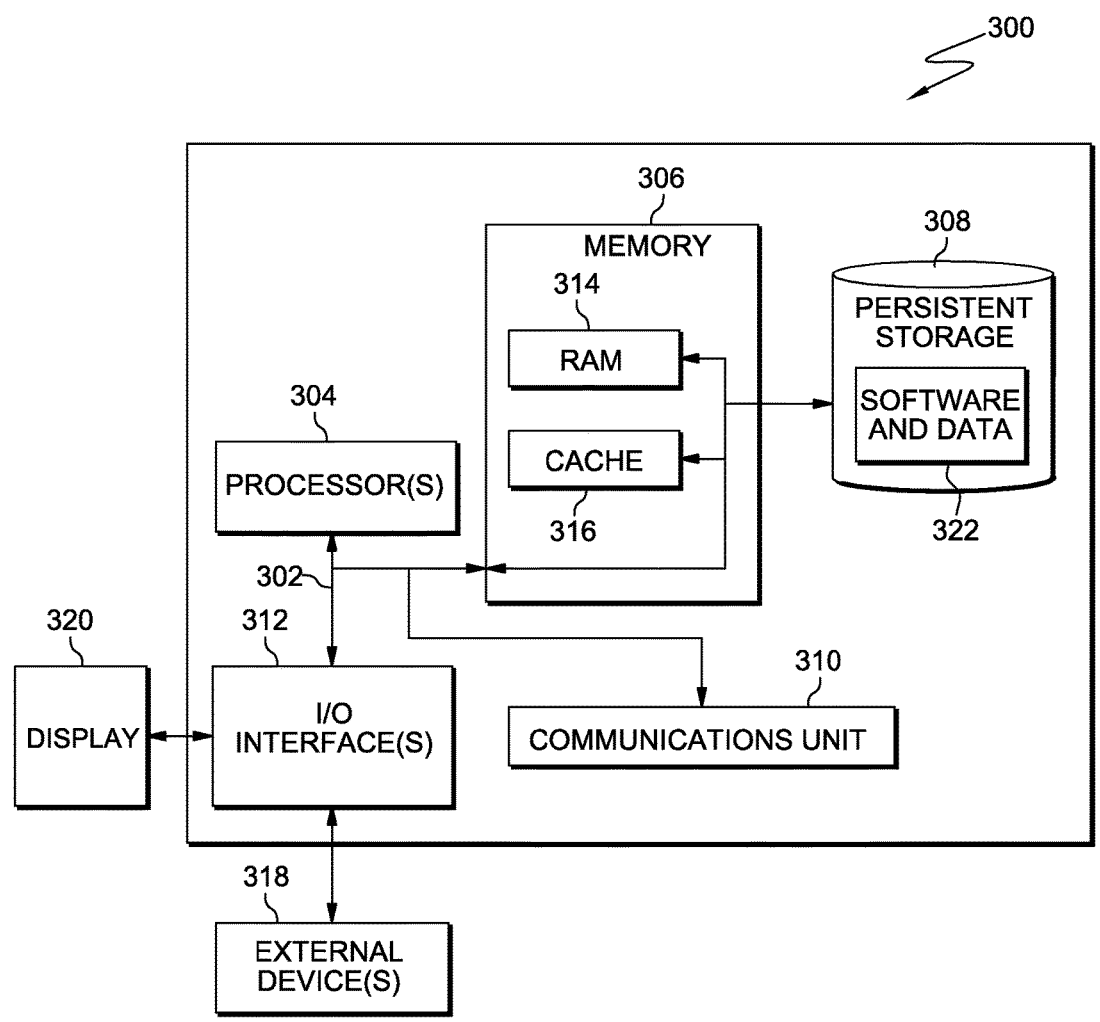
FIG. 3 depicts a block diagram of components of a computing system representative of the client device and computing device of FIG. 1 in accordance with an embodiment of the present invention.

FIG. 3 depicts a block diagram of components of computer 300, which is representative of client device 120 and computing device 130 in accordance with an illustrative embodiment of the present invention. In another embodiment, computing device 130 is a USB storage device. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media. Software and data 322 are stored in persistent storage 308 for access and/or execution by processors 304 via one or more memories of memory 306. With respect to client device 120, software and data 322 includes operating system 124. With respect to computing device 130, software and data 322 includes network address program 200.

In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 may include one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data 322 can be stored on such portable computer readable storage media and can be loaded onto persistent storage 308 via I/O interface(s) 312. I/O interface(s) 312 also can connect to a display 320.

Display 320 provides a mechanism to display data to a user and may be, for example, a computer monitor. Display 320 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining network information, the method comprising:

in response to a computing device connecting to a computing system, the computing device identifying network information that corresponds to the computing system, wherein the computing system is configured to pass network information to the computing device while the computing system is powered on, but not logged in;

the computing device determining at least one network address for the computing system utilizing the identified network information that corresponds to the computing system; and the computing device displaying the determined at least one network address for the computing system.

2. The method of claim 1, wherein the computing device connects to the computing system via a serial port of the computing system.

3. The method of claim 1, wherein the determined at least one network address includes one or more of: an Internet Protocol (IP) address and a media access control (MAC) address.

4. The method of claim 1, wherein the computing device is a Universal Serial Bus (USB) storage device.

5. The method of claim 1, wherein the computing device is a mobile phone.

6. The method of claim 1, wherein the identifying network information that corresponds to the computing system, further comprises:

the computing device querying a router associated with the computing system for network information that is assigned to the computing system, wherein the computing device utilizes an operating system of the computing system to query the router.

7. The method of claim 1, wherein the identifying network information that corresponds to the computing system, further comprises:

the computing device identifying network information corresponding to the computing system utilizing a Basic Input/Output System (BIOS) of the computing system.

8. A computer program product for determining network information, the computer program product comprising:

one or more computer readable storage devices and program instructions stored on the one or more computer readable storage devices, the program instructions comprising:

in response to a computing device connecting to a computing system, program instructions to identify network information that corresponds to the computing system, wherein the computing system is configured to pass network information to the computing device while the computing system is powered on, but not logged in;

program instructions to determine at least one network address for the computing system utilizing the identified network information that corresponds to the computing system; and program instructions to display the determined at least one network address for the computing system.

9. The computer program product of claim 8, wherein the computing device connects to the computing system via a serial port of the computing system.

10. The computer program product of claim 8, wherein the determined at least one network address includes one or more of: an Internet Protocol (IP) address and a media access control (MAC) address.

11. The computer program product of claim 8, wherein the computing device is a Universal Serial Bus (USB) storage device.

12. The computer program product of claim 8, wherein the computing device is a mobile phone.

13. The computer program product of claim 8, wherein program instructions to identify network information that corresponds to the computing system, further comprising program instructions, stored on the one or more computer readable storage devices, to:

query a router associated with the computing system for network information that is assigned to the computing system, wherein the computing device utilizes an operating system of the computing system to query the router.

14. The computer program product of claim 8, wherein program instructions to identify network information that corresponds to the computing system, further comprising program instructions, stored on the one or more computer readable storage devices, to:

identify network information corresponding to the computing system utilizing a Basic Input/Output System (BIOS) of the computing system.

15. A computer system for determining network information, the computer system comprising:

one or more computer processors;

one or more computer readable storage media; and program instructions stored on the computer readable storage media for execution by at least one of the one or more processors, the program instructions comprising:

in response to a computing device connecting to a computing system, program instructions to identify network information that corresponds to the computing system, wherein the computing system is configured to pass network information to the computing device while the computing system is powered on, but not logged in;

program instructions to determine at least one network address for the computing system utilizing the identified network information that corresponds to the computing system; and program instructions to display the determined at least one network address for the computing system.

16. The computer system of claim 15, wherein the computing device connects to the computing system via a serial port of the computing system.

17. The computer system of claim 15, wherein the determined at least one network address includes one or more of: an Internet Protocol (IP) address and a media access control (MAC) address.

18. The computer system of claim 15, wherein the computing device is a Universal Serial Bus (USB) storage device.

19. The computer system of claim 15, wherein the computing device is a mobile phone.

20. The computer system of claim 15, wherein program instructions to identify network information that corresponds to the computing system, further comprising program instructions, stored on the one or more computer readable storage media, to:
   query a router associated with the computing system for network information that is assigned to the computing system, wherein the computing device utilizes an operating system of the computing system to query the router.

\* \* \* \* \*